Feb. 13, 1968   D. C. BRODERICK   3,369,196
GASEOUS-SOLID STATE POWER LIMITER
Filed May 3, 1966   2 Sheets-Sheet 1
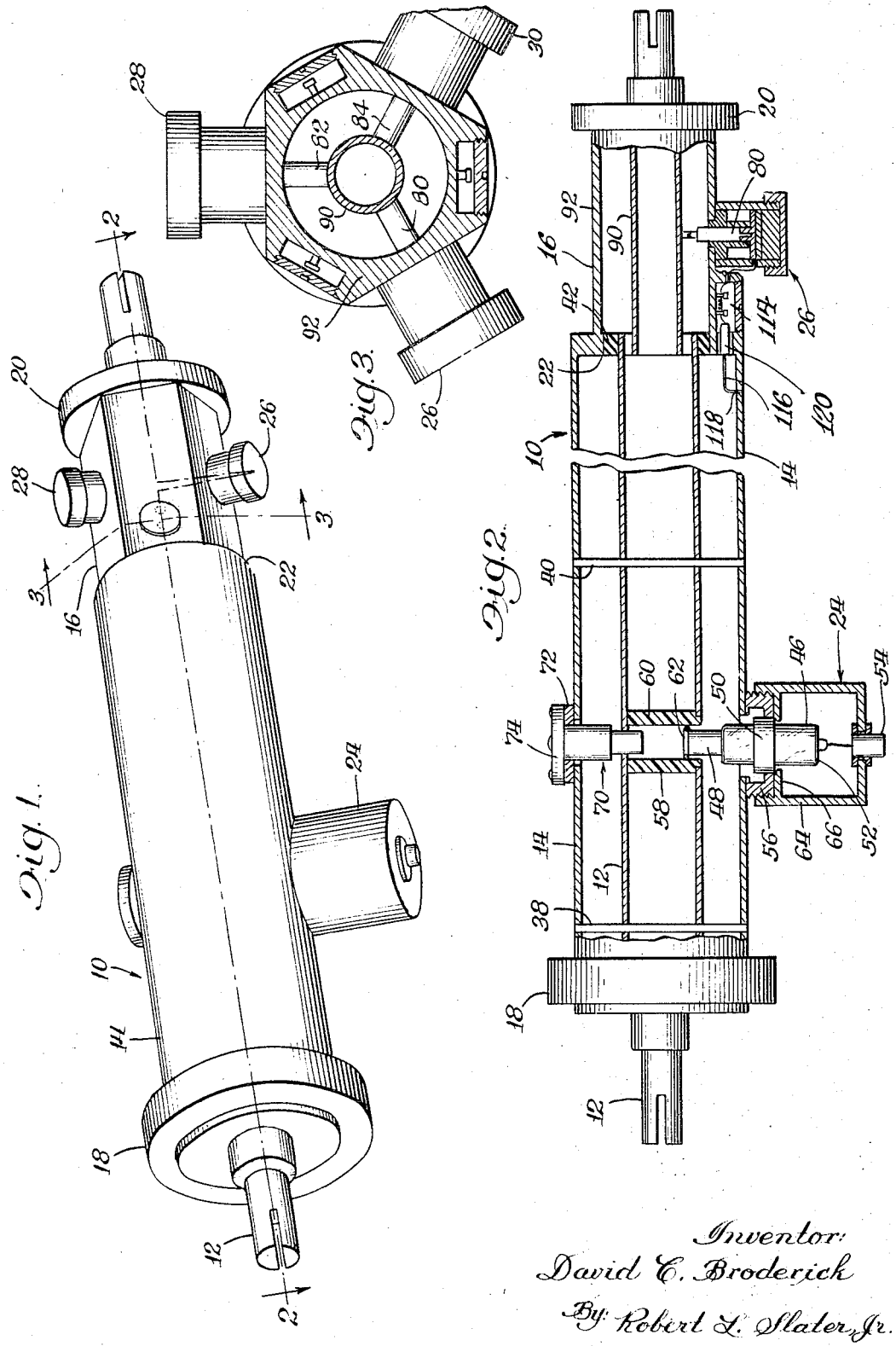
Inventor:
David C. Broderick
By: Robert L. Slater, Jr.
Atty.

Feb. 13, 1968   D. C. BRODERICK   3,369,196
GASEOUS-SOLID STATE POWER LIMITER
Filed May 3, 1966   2 Sheets-Sheet 2
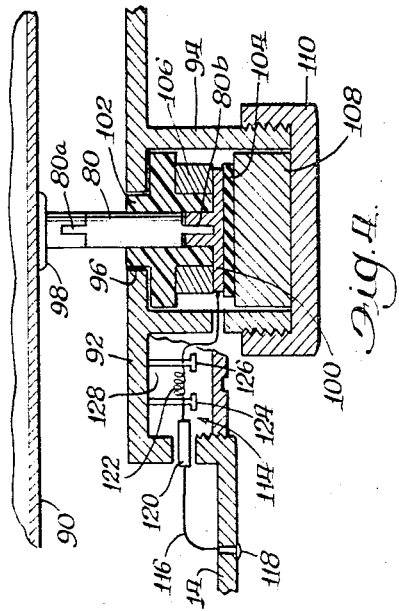
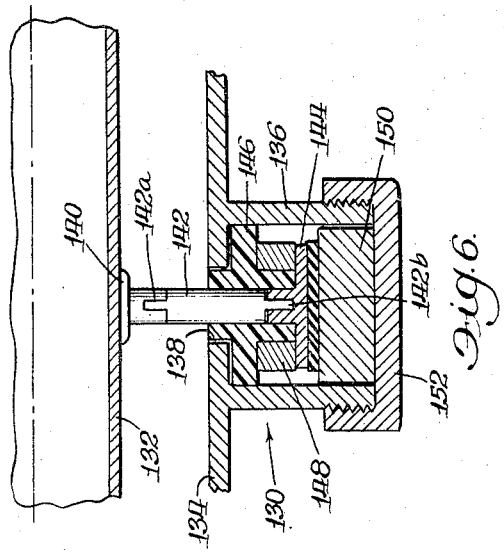
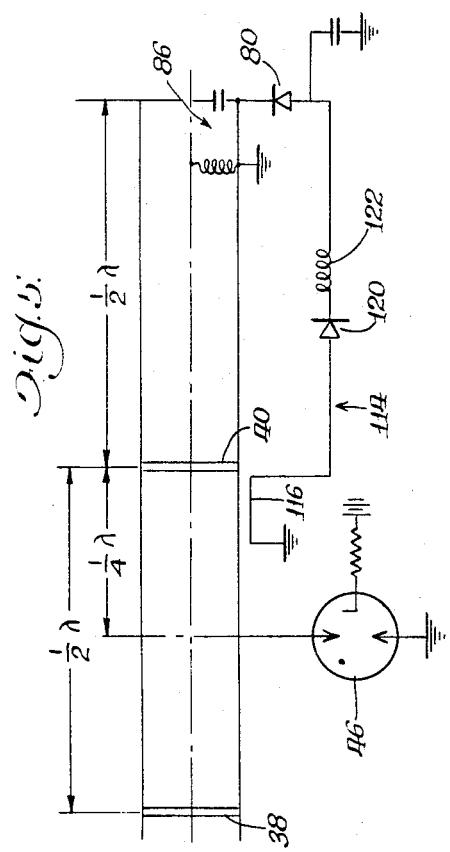
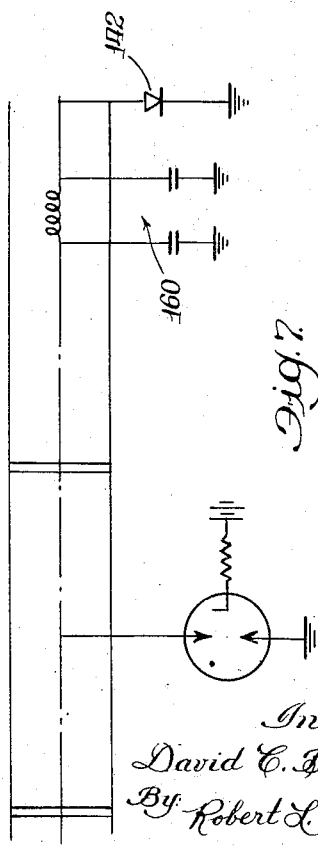
Inventor:
David C. Broderick
By Robert L. Slater, Jr.
Atty.

United States Patent Office 3,369,196
Patented Feb. 13, 1968

3,369,196
GASEOUS-SOLID STATE POWER LIMITER
David C. Broderick, Beverly, Mass., assignor to Metcom, Inc., Salem, Mass., a corporation of Delaware
Continuation-in-part of application Ser. No. 214,546, Aug. 3, 1962. This application May 3, 1966, Ser. No. 547,248
2 Claims. (Cl. 333—13)

This application is a continuation-in-part of a copending application Aug. 3, 1962, titled "Gaseous-Solid State Power Limiter," David C. Broderick, inventor, Serial Number 214,546, now Patent No. 3,249,899 issued May 3, 1966.

The present invention relates to devices for limiting passage of peak loads of electromagnetic energy; more particularly, it relates to devices for limiting the propagation of destructively high power radio frequency signals through coaxial wave guides.

Radar, microwave systems, and other high frequency systems require that sensitive system components, receivers, and crystal detectors be protected from direct incidence of high powered radio frequency energy pulses. For instance, in radar equipment exposure of sensitive parts of the system to destructively high powered microwave pulse signals arises when the high powered pulse generator, most frequently a magnetron, fires, or when directly beamed signals from a second microwave system fall on the antenna and are transmitted back to the receiver or other sensitive elements of the system. When protection from excessively high power pulse signals is being designed, for example for use in a radar system, it is known what frequency signals will be emitted by the magnetron or signal generator incorporated within the system. However, it is not predictable what frequency range of signals arising from other radar sets may be beamed directly onto the antenna of the system. It is, therefore, important that the sensitive elements of a radar system be protected against stray high powered radiation throughout a wide range of frequency bands.

Gaseous electron discharge tubes which have a resonant discharge gap mounted within a cavity have long been utilized as TR or transmit-receive tubes, and as ATR or anti-transmit-receive tubes, in radar systems. In typical installations, the TR tube is mounted so that upon incidence of a high power pulse signal, the tube fires, that is, the gas within the tube cavity ionizes and electrons are discharged. As a result of the electron discharge, a highly conductive electron stream or arc shorts the wave guide, which in the conventional installation designs isolates the receiver from the full amplitude of the incident high powered signal.

One significant disadvantage of the conventional gaseous TR tube when used alone as the sole protective element for a system receiver is the fact that in the brief interval of time between the incidence of the signal and the actual shorting of the TR tube by the electron discharge, a substantial power "spike" passes the tube and travels into the receiver. This initial power spike passes the gap even though a powered "Keep-alive" electrode is mounted in the resonant gap of the electron discharge tube.

A continuing trend of utilizing more powerful signal generators and even more sensitive receivers has heightened the need for improved, more reliable protection of receivers and particularly receiver crystals in radar systems.

The ideal microwave receiver protective device affords substantial attenuation of high powered signals throughout the dynamic range of system frequencies, a low insertion loss for low powered signals, sufficiently rapid response time to minimize or even eliminate the initial "spike" from reaching the receiver, a rapid recovery time to accommodate high pulse repetition rate, and dependable long life operation. Some solid state semiconductor devices exhibit in a general way the highly nonlinear power attenuation characteristics that are required to pass low signals with minimum insertion loss and attenuate high power signals with high efficiency. However, none of the existent solid state components is suitable for direct substitution for the gaseous electron discharge tube. The reason for this unsuitability in existing solid state devices for direct substitution for gaseous electron discharge tubes arises from the fact that these semiconductor devices are limited by their maximum power density; that is, most solid state or semiconductor devices are extremely small and dissipate only a limited amount of energy by radiation or convective cooling. Another limitation of existing semiconductor devices which renders them unsuitable for direct substitution for gaseous electron discharge TR tubes is that they exhibit relatively large reactances which cause reflection of incident power. High frequency performance in solid state devices, that is, in the megacycle and kilomegacycle region, requires that the distances between the electrodes and boundaries of the component parts of the device be sufficiently short so that the junction reactance, spreading resistance and transit times of electrons or holes through the semiconductor, will be consistent with the high frequency requirements of the device. In general, then, the smaller the solid state or semiconductor structures, the higher the frequency response before cut-off exhibited by the device but the less capacity in general the semiconductor device will exhibit to dissipate heat in higher power applications and, in a general sense, the less easily will the device be matched in impedance to the input and output structures with which it is mounted in a given system.

There exists, then, need for improved power limiting devices which effectively function across a wide frequency range and afford low insertion loss for low power signals and high attenuation for high power signals. Presently used gaseous electron discharge tubes have typical insertion losses of 0.5 db of low power signals, that is, signal strengths of 1–2 watts peak power, and 10 db attenuation of high power signals, that is, signal strengths above 10 watts peak power, through a frequency band pass range of ten percent.

The copending application previously referred to contained a specification for essentially stripline devices. As herein will be more fully described, devices with similar functions may be provided for coaxial wave guides.

Accordingly, one object of my invention is to provide a novel power limiter for attenuating excessively high power signals ranging from UHF frequencies upward, for use in coaxial wave guide system.

Another object of my invention is to provide a highly efficient radio frequency power limiter which reduces and substantially eliminates the initial power "spike" which passes conventional gaseous electron discharge tubes, for use in a system utilizing coaxial wave guides.

Another object of my invention is to provide a broad radio frequency band power limiter utilizing lightweight, compact, solid state semiconductor structures, for use in a coaxial wave guide member.

Still another object of my invention is to provide a novel, rugged general purpose radio frequency power limiter.

These and other objects of my invention will be apparent from the following drawings, specifications, and claims.

FIGURE 1 is a perspective view of a preferred embodiment of my invention.

FIGURE 2 is a longitudinal cross-section view along the plane 2—2 of the embodiment of my invention shown in FIGURE 1.

FIGURE 3 is a transverse cross-section view as seen at plan 3—3 of the embodiment of my invention shown in FIGURE 1.

FIGURE 4 is an enlarged fragmentary view of the embodiment of my invention shown in FIGURE 1.

FIGURE 5 is a schematic circuit diagram of the embodiment of my invention shown in FIGURE 1.

FIGURE 6 is a fragmentary view of a variation of the embodiment of my invention shown in FIGURE 1.

FIGURE 7 is a schematic circuit diagram of the variation of the embodiment of my invention illustrated in FIGURE 6.

FIGURE 1 is an exterior view of a preferred embodiment of my invention which is comprised of a length of coaxial conductor 10 having an inner conductor 12 and an outer conductor 14; a second length of coaxial conductor 16 of a different and, in the present embodiment, smaller diameter is mounted to the output end of conductor 10. My power limiting device is mounted to a radar system, for instance, by means of a coupling flange 18 at the input end and coupling flange 20 at the output end. The joining at 22 of the two coaxial wave guide sections 10 and 16 having different diameters permits adjustment of the impedance to facilitate maintaining the desired impedance of the device as a whole. The effects of the various sections as illustrated are discussed below.

A tube mounting structure 24 which houses a two-terminal electron discharge tube is positioned on the side of the coaxial wave guide 10. Similarly, mounting structures 26, 28 and 30 for housing solid state nonlinear components are fixed to the side of the smaller coaxial wave guide section 16. The arrangement of the solid state housing structures, is best seen in FIGURE 3.

The coaxial wave guide 10 is provided with two shunt reactive posts 38 and 40 mounted in electrically spaced relationship. The drawings illustrate a spacing between the shunt reactive posts of one-half electrical wavelength; however, any even integral number of quarter wavelengths separation would serve equally as well. A standing wave is propagated in the electrical "cavity" formed within the space between the posts 38 and 40. The Q of the cavity is determined by the diameter of the posts.

Added rigidity is obtained in the coaxial wave guide by the presence of the posts 38 and 40. Similarly, a support ring 42 is inserted between the inner and outer conductors at the wave guide discontinuity between sections 10 and 16. The discontinuity in wave guide size is not required to form the electrical "cavity." The smaller size of the wave guide section 16 is merely more convenient for mounting the solid state components described below and facilitate impedance matching within the limiter to compensate for the presence of the active nonlinear elements which comprise the limiter combination.

A gaseous electron discharge tube 46 is mounted, as will be described below, at a position midway between the posts 38 and 40 at a point of maximum amplitude of the aforesaid standing wave pattern. The tube 46 is comprised of a first terminal 48, a ground terminal 50, an ionization gap, the sides of which are connected respectively to the terminals 48 and 50, a quantity of ionizing gas mixture sealed within an envelope 52 and a keep alive electrode. The ionization gap and keep alive electrode are not shown in the illustrations, but are conventional in all respects. The keep alive electrode is powered through the keep alive terminal 54.

A threaded boss 56 is integrally mounted to the outer conductor 14. A central aperture is provided in the boss 56 and is aligned with a transverse aperture which extends diametrically through the coaxial wave guide as may be seen in the figures. Dielectric spacers 58 and 60 are inserted within the inner conductor to provide rigidity and to provide added support for a socket contact 62. The tube terminal 48 is inserted into and held by the socket contact 62 thus making RF contact with the inner conductor. A threaded cap 64, which is provided with an internal flange 66, attaches to the boss 56. The flange 66 bears upon the ground terminal 50 of the tube providing both electrical ground contact and mechanical clamping action which holds the tube in place.

A tuning slug 70 is suspended in the wave guide aperture opposite the tube 46. The slug 70 is mounted through a dielectric pad 72 and suspended from a tuning slug cover 74, which permits small movement of the tuning slug by means of a threaded bolt. Adjustment of the position of the tuning slug enables the operator to make fine tuning adjustments after replacement or remounting of a tube.

Two terminal semiconductor devices 80, 82, 84, described more fully below, are mounted as will appear from the following description between the inner and outer coaxial conductors 12, 14 within the housings 26, 28 and 30 respectively. The nonlinear characteristics of the semiconductor devices, for example, are such that they are essentially reactive in response to low power incident RF waves and essentially conductive in response to high power incident waves. In an equivalent circuit the semiconductor 80 would appear as highly capacitive in response to low power signals and appear conductive in response to high power signals.

The shunt inductor posts 38 and 40 in an equivalent two wire transmission system would be equivalent to two parallel inductances shunted between the two transmission wires. The inductance of the posts 38 and 40 together with the capacitance of the semiconductor devices form a band pass filter 86 for signals passed by the wave guide.

Silicon diffused junction diodes of the mesa design, commonly called veractors, have operated satisfactorily in specific embodiments of this invention. A typical diode, such as was used in operating models of this invention would be conductive in the forward path at 0.6 volts, with cutoff frequency above 100 kmc., dissipating up to 300 milliwatts of power. However, numerous other diodes and two terminal semiconductor devices are available which will serve equally well.

The limiter section 16 of my device is comprised of a coaxial wave guide of reduced diameter having inner conductor 90 and outer conductor 92. The outer conductor 92 has a heavier wall than conventional in order to mount the structures described below. The semiconductor device or diode 80, for example, is mounted within the housing 26 which is comprised of a threaded boss 94 mounted integrally to the wave guide outer conductor 92. The boss 94 is provided with a central aperture which is aligned with an aperture 96 cut transversely through the outer conductor 92.

A socket contact 98 is mounted by solder or brazing to the inner conductor in alignment with aperture 96. The diode 80, which has two short terminals designated as 80a and 80b, is positioned so that terminal 80a is inserted into the socket 98 and makes electrical contact with the inner conductor 90. The diode contact 80b is then within the central aperture of the boss 94. An enlarged diode terminal cap 100 is fitted over the diode terminal 80b.

A flanged dielectric sleeve 102 fits over the body of the diode 80 and both supports and isolates it from the outer conductor 92 at the point where the diode passes through the outer conductor aperture 96. A dielectric spacer 104 is placed over the end of the terminal cap 100. A nongrounded conducting ring 106 is fitted about the dielectric sleeve 102 to provide heat conduction away from the diode. A metallic grounded heat sink is juxtaposed to the dielectric spacer 104, and the whole assembly is held together by means of a threaded cap 110. The mounting arrangement of the above described parts is most easily seen in FIGURE 4.

In the embodiment of my invention illustrated in FIGURES 1 through 4, a bias circuit 114 is provided which serves to couple a small quantity of RF energy from the wave guide and bias the diode to conduction simultaneous with or prior to the arrival of high energy RF waves at the plane of the diode. The bias circuit 114 is comprised of a probe 116 grounded at one end 118 and connected to the diode terminal cap 100 through a series rectifying diode 120 and a small inductance 122 for phase adjusting. The bias circuit is shown as being supported on two insulated support posts 124, 126. A recess 128 and small connecting openings are provided in the outer conductor 92 and through the side of the boss 94 to accommodate the bias circuit.

Semiconductors 82 and 84 are mounted within housings 28 and 30 respectively, with fittings and mounting details substantially identical to the mounting of diode 80 within housing 26 described above. A plurality of diodes may be mounted in my invention in parallel as shown in FIGURE 3 with the advantage of increased power limiting capacity. Some frequency range at higher frequencies is lost with increased numbers of diodes in the system. My invention operates through a useful range of power loads and a wide frequency band utilizing a single diode element; however, I have constructed models utilizing five diodes which provided greatly enhanced power limiting capability with only modest loss of response at higher frequencies.

Operation of my invention may be readily understood by reference to the schematic diagram in FIGURE 5. The gaseous electron discharge tube 46 is mounted at a point of maximum amplitude in a standing wave pattern which is generated between the reactive posts 38 and 40 mounted within a section of coaxial wave guide. If the reactive posts are separated ½ electrical wave length, the point of maximum amplitude will be midway between the posts. A nonlinear diode 80 which is capacitive for low power incident RF waves and conductive for high power incident waves is mounted in the coaxial line ¾ electrical wave length from the gas tube. A passive filter 86 having a limited band pass frequency is formed from the inductance of the posts 38 and 40 and the capacitance associated with the diode 80. The bias circuit 114 couples a small quantity of energy from the wave guide by means of the probe 116, rectifies the bias signal by means of a diode 120 and connects to the RF grounded terminal 80b of the diode 80. It is necessary to separate the RF ground from the DC ground to effectively utilize the bias circuit. Thus, a self-biasing effect is obtained from the combination of elements which comprise my invention.

It is to be understood that the electrical spacing may be varied from that described above provided an odd integral number of quarter wave lengths are maintained between the gaseous electron discharge tube and the semiconductor.

A useful variation on the embodiment of my invention described above is illustrated in FIGURES 6 and 7 in which the bias circuit has been eliminated for simplicity and reduction in cost and number of required components. In the absence of the bias circuit the solid state element may be grounded without requiring separation of the RF and DC grounds. The advantage is illustrated in FIGURE 6 which shows a cross section view of a housing 130 similar to that shown at 26 in connection with FIGURE 1 except as described below. The FIGURE 6 embodiment is in all respects identical to that of the FIGURE 1 device except for the variation in mounting of the solid state element. Referring now to FIGURE 6 a coaxial wave guide having an inner conductor 132 and an outer conductor 134 is provided with a threaded boss 136 that has a central aperture and is integrally mounted externally to the outer conductor 134. A transverse aperture 138 aligned with the boss 136 is provided in the outer conductor 134. A socket contact 140 is brazed to the inner conductor in alignment with the aperture 138.

A diode 142 having terminals 142a and 142b is mounted with the cathode terminal inserted into the socket 140 in contact with the inner conductor 138. An enlarged terminal cap 144 is placed over the anode terminal 142b of the diode. A flanged dielectric sleeve 146 fits over the diode body. A heat conduction ring 148 and a grounded heat sink block 150 are clamped to the terminal cap by means of a threaded cap 152. The mounting arrangement described above is readily visualized by reference to FIGURE 6.

The operation of the solid state limiter illustrated in FIGURE 6 can be readily understood by reference to FIGURE 7 wherein a gaseous electron discharge tube is mounted at a point of maximum amplitude in a standing wave pattern generated by two spaced reactive shunt posts. The above is identical with that arrangement shown in FIGURE 5 and described above. The inductance of the posts combined with the capacitance of the diode 142 form a passive band pass filter shown schematically at 160. The diode 142 is mounted on odd integral quarter electrical wave lengths from the gaseous electron discharge tube.

When high intensity RF waves impinge upon the cavity a standing wave of sufficient intensity is generated to excite the ionizable gas within the tube and an electron discharge results which shorts the wave guide and momentarily prevents passage of RF waves. Prior to discharge of the tube a "spike" of high intensity energy passes the plane of the tube terminals and is propagated through the passive band pass filter 160, if it falls within an appropriate frequency range. The presence of the high intensity RF waves switches the diode 142 from a capacitive to a conductive condition. The diode switching detunes the band pass filter which then acts to reflect a substantial portion of the high energy "spike," and also conducts present residual energy to ground. The absence of the bias circuit does not alter the function of my invention except that a slightly high intensity signal is required to switch the diode into a conductive condition then when the diode is otherwise biased into near conduction before the arrival of high energy RF waves.

The foregoing specifications and descriptions are intended as merely illustrative of my invention, the scope of which is set forth in the following claims.

What is claimed is:

1. A device for limiting the power of high frequency electrical signals comprising in combination a section of coaxial wave guide having an inner conductor and an outer conductor, means within the wave guide which give rise to a discontinuity in impedance, a gaseous electron discharge tube mounted at a spaced electrical distance from the discontinuity in shunt between the inner and outer conductors, nonlinear solid state means mounted in shunt between the inner and outer conductors at a spaced electrical distance from the tube; the solid state means being essentially reactive at low power incidence and essentially conductive at high power incidence; whereby electrical signals of limited power only are passed by the device, the power of such electrical signals being limited when the gaseous electron discharge tube fires, such power being further limited when the nonlinear means conducts between the inner conductor and the outer conductor, and bias means mounted within the wave guide to couple energy from the wave guide, said bias means being connected to said solid state means whereby said solid state means may be biased into a conductive condition when the high frequency energy is coupled into the bias means.

2. A device for limiting the power of high frequency RF signals comprising in combination a length of coaxial conductor having an inner and an outer conductor in coaxially spaced relationship; a plurality of reactive impedance means mounted within the coaxial wave guide for generating a standing wave pattern upon incidence of RF signals, a two terminal gaseous electron discharge tube mounted in shunt between the coaxial inner and outer conductors at a spaced electrical distance from the impedance means; a variable reactance two terminal semiconductor means mounted in shunt between the inner and outer coaxial conductors at a spaced electrical distance from the tube, and passive bias means mounted within the wave guide to couple energy from the wave guide and being further connected to one terminal of the semiconductor means wherewith the semiconductor means may be biased into a conductive condition when RF energy is coupled into the bias means.

References Cited
UNITED STATES PATENTS

| | | | |
|---|---|---|---|
| 3,131,365 | 4/1964 | Hoover | 333—13 X |
| 3,174,119 | 3/1965 | Jones et al. | 333—13 X |
| 3,249,899 | 5/1966 | Broderick | 333—13 |

HERMAN KARL SAALBACH, *Primary Examiner.*

R. F. HUNT, M. L. NUSSBAUM, *Assistant Examiners.*